United States Patent [19]

Carroll et al.

[11] 3,806,695

[45] Apr. 23, 1974

[54] METHOD FOR VERTICAL-UP OPEN-ARC WELDING USING MOLDING SHOES

[75] Inventors: John E. Carroll, Chagrin Falls; Carl E. Stump, Cleveland, both of Ohio

[73] Assignee: The Lincoln Electric Company, Cleveland, Ohio

[22] Filed: Jan. 17, 1972

[21] Appl. No.: 218,487

[52] U.S. Cl.................. 219/126, 219/73, 219/74, 219/137
[51] Int. Cl............................................. B23k 9/12
[58] Field of Search .............. 219/137, 126, 73, 74

[56] References Cited
UNITED STATES PATENTS

| 3,177,340 | 4/1965 | Danhier | 219/146 |
| 3,612,817 | 10/1971 | Tichelaar et al. | 219/126 |
| 1,796,969 | 3/1931 | Strobel | 219/123 |
| 2,743,342 | 4/1956 | Buttis et al. | 219/123 |
| 1,869,350 | 7/1932 | Lincoln | 219/123 |
| 1,906,496 | 2/1933 | Stine et al. | 219/123 |

Primary Examiner—J. V. Truhe
Assistant Examiner—George A. Montanye
Attorney, Agent, or Firm—Meyer, Tilberry & Body

[57] ABSTRACT

A method of vertical-up welding using molding shoes to hold the molten metal in position wherein: the arc current; the electrode stickout; the current density in the stickout portion; the spacing of the edges to be welded; and, arc voltage are all so interrelated that the total heat input to the weld is between 300,000 and 550,000 Joules per linear inch of weld per inch of plate thickness such that the deposited weld metal as it cools passes so rapidly through its critical transformation temperatures that the weld metal has superior impact and tensile strengths. The electrode nozzle is so constructed as to provide a magnetic field at the arc.

3 Claims, 6 Drawing Figures

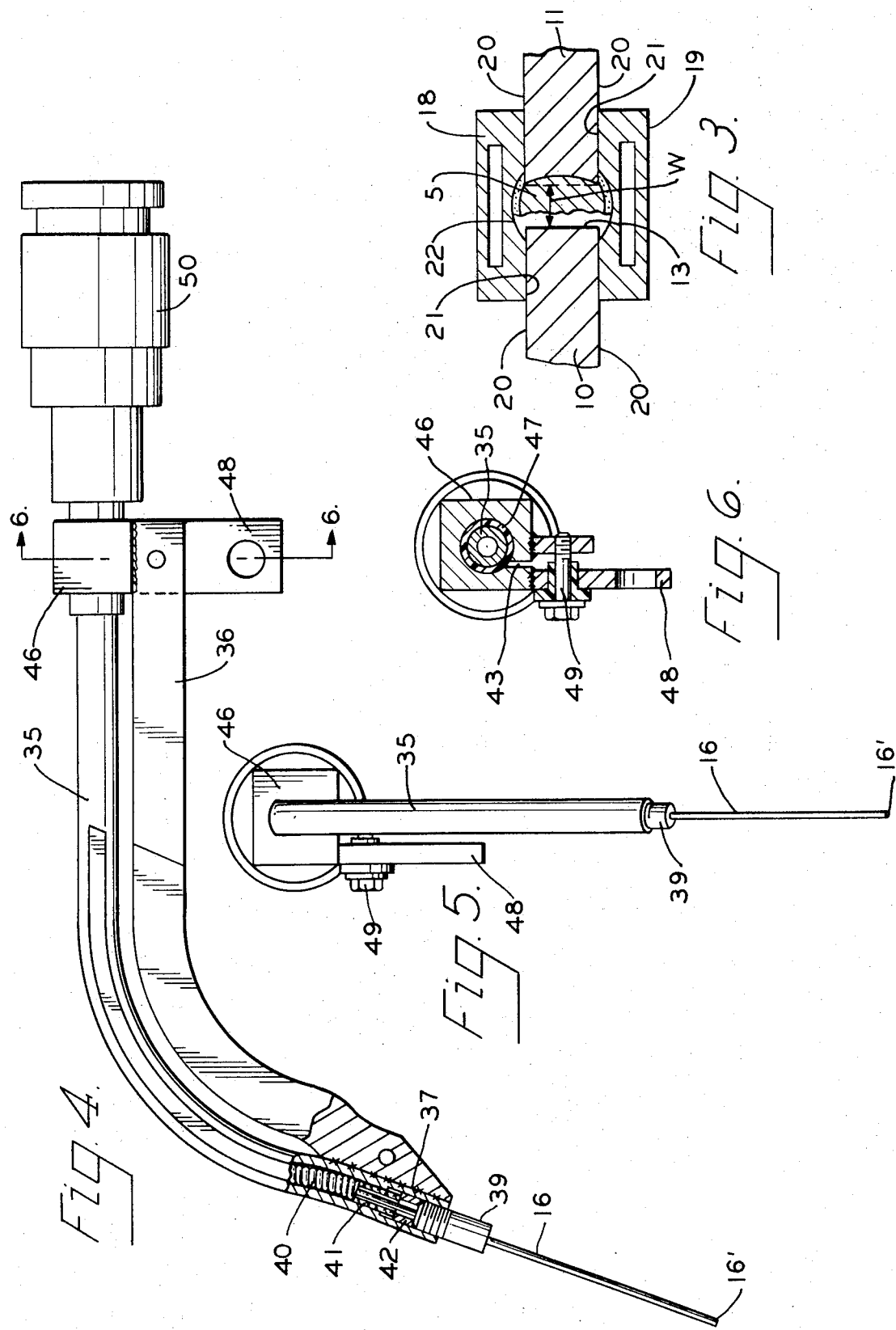

METHOD FOR VERTICAL-UP OPEN-ARC WELDING USING MOLDING SHOES

The present invention relates to the art of vertical-up welding using molding shoes and more particularly to means and methods for such welding as to provide high impact and yield strengths.

The invention is applicable to the use of a cored-type welding electrode, which produces its own shielding gas, and to the use of movable molding shoes and will be described with particular reference thereto although it will be appreciated that in many instances elongated stationary molding shoes may be used.

It is conventional today to weld heavy steel plates together by positioning them vertically with their edges in spaced-parallel relationship, bridging the gap by means of a pair of molding shoes to form an upwardly-opening well and continuously depositing weld metal in the well so formed using an electric arc or electro-slag techniques as means for providing the heat for welding. The molding shoes are generally in the form of copper dams, either long enough to cover the entire joint or are caused to slide upwardly along the joint as the weld metal is deposited and solidifies. These processes are known either as electro-slag or electro-gas welding.

In the electro-slag process, an electrically-energized electrode is fed continuously into a molten pool of slag held in place by the edges of the workpiece and the two dams. The conduction of the current through the slag heats the slag and causes the electrode end to melt off and fuse with the workpiece. There is no arc involved in this welding process.

In the electro-gas process, an electrically-energized electrode is continuously fed toward the molten pool while maintaining an open arc between the end of the electrode and the molten pool of metal. The arc is then shielded by externally-supplied carbon dioxide gas or a mixture of argon and carbon dioxide. The arc melts off the electrode end and the molten metal fuses with the edges of the workpiece.

One of the principal difficulties with the vertical-up welding heretofor has been in obtaining physical characteristics of the deposited weld metal which would meet the physical specifications of the American Welding Society. Thus, weld beads, formed by the vertical-up welding processes have tended to have low impact strengths and low yield points particularly when compared with the conventional multiple pass down-hand weld beads.

A further problem with vertical-up welding has been the slow linear welding speeds due to the large amounts of metal which must be deposited to fill up the weld gap which must of necessity be of considerable width to allow clearance for the electrode and the electrode nozzle.

Heretofore, the selection of mechanical arrangements and electrical parameters for vertical-up welding have been haphazard and without regard to the interrelation that exists in those factors which contribute to the soundness and required physical properties of the deposited weld metal.

As a result of the present invention, it has been determined that by carefully controlling the interrelationship that exists between the mechanical and electrical parameters, it is possible to control the energy input to the weld within a narrow band which results in acceptable yield strengths and notch toughness in the deposited metal.

Thus, the physical properties of the weld deposit are traceable to the weld metal chemistry and to the thermal history of the weld deposit.

As to the weld metal chemistry, usually the plates being welded and the weld metal contain silicon, manganese, and carbon as the principal alloying ingredients and possibly minor amounts of other alloying ingredients such as nickel chromium and the like. The weld metal chemistry forms no part of the present invention.

As to thermal history, in vertical-up welding, the size and shape of the molten pool as it advances vertically is determined by the energy input to the weld. The size and shape of this advancing molten nugget determines the orientation of the dendrites that advance from the walls of the pool toward the center as the whole system advances vertically upwardly and the metal freezes. A large molten pool is conducive to the freezing of a columnar structure whereas a smaller pool is more conducive to dendritic branching of the advancing crystals. Pools created by an energy input of 300,000 to 550,000 Joules per inch of weld per inch of plate thickness freeze in such an orientation that the planes of weakness created by the columnar structure are mixed and in such a direction that they have little or no influence on the normal physical tests applied to the weld.

It has further been found that having the electrode positive and applying a magnetic field at the arc oriented in such a way that the magnetic lines of force are parallel to the axis and north pole oriented in a direction opposite to the direction the wire is being fed, the physical properties of the weld metal will be substantially improved. Even if the field is oriented in the opposite direction, the influence on the physical properties of the weld metal can still be detected. It is believed that a small magnetic field at the arc causes the arc to swirl which distributes the heat over the molten face of the pool thereby decreasing the depth of the weld pool which is in the direction of enhancing crystal growth that is conducive to good physical properties.

The field is established by passing the welding current through at least one turn on the nozzle which guides the electrode toward the weld pool. More turns may be used and increased benefits result; however, it has been found that when more than seven turns have been used, the increasing benefits diminish to a point where the increments are no longer detectable.

In accordance with the present invention, the welding parameters are so adjusted and correlated that the rate of heat input to the weld bead, where the alloying ingredients in the parent metal are principally silicon, manganese, and carbon, is held between a value of 300,000 and 550,000 Joules per lineal inch of weld per inch of workpiece thickness (Joules/$i/i$). Energy inputs higher than 550,000 Joules/$i/i$ result in crystal orientation such that planes of weakness are created that affect the notch toughness of the weld. Energy inputs less than 300,000 Joules per inch of weld per inch of plate thickness results in welds that are chilled rapidly enough to acquire some martensite or strained structure in the weld which also affects the notch toughness of the metal adversely.

The higher rates of heat input result in a slower lineal welding speed. 450,000 Joules/$i/i$ maximum is preferred.

A principal objective is to weld as rapidly as possible vertically and still remain within the energy input levels indicated. This objective is achieved as follows:

First of all, the gap between the edges of the workpiece is held to the minimum possible commensurate with having the electrode extend into the well with the arc only between the end of the electrode and the molten weld pool. Thus assuming a gap width of one-half inch and an electrode on the order of one-eighth to five thirty-second inch, there is only a three-sixteenth inch spacing between the sides of the electrode and the plate edge. This is the maximum possible spacing and if the electrode end tends to wander slightly will be even less. The arc has a finite length depending on the arc voltage. If the arc length exceeds this spacing, there will be a tendency for the arc to shift to between the side of the electrode and the edge of the plate rather than from the end of the electrode to the weld pool. One half inch spacing is deemed the minimum practical edge spacing for square-edge plates one-half to 1¼ inch thick. When the gap increases, the lineal welding speed decreases and the rate of heat input can increase beyond the maximum stated.

Thus, in accordance with the invention the plate edges are spaced between one-half and three-fourth inches with the greater width gaps being used on thicker plates. With this narrow spacing, the total amount of new metal which must be melted from the electrode, all of which requires heat, is held to the minimum for a given cross-sectional thickness of workpiece. V grooves can also be used as long as the area of weld is kept the same as for square-edge plate preparation.

Normally, in order to reduce the heat input into a weld bead, the welding current would be reduced. However, in accordance with the present invention, the welding current is kept at a such high level that the current density in that portion of the electrode sticking out beyond the electrode energizing nozzle is high enough that the stick-out portion will be substantially heated by the currents flowing therethrough due to what is termed $I^2R$ heating. In addition to this, the distance through which this current is allowed to flow is substantially increased beyond that normally employed in vertical-up electro gas welding. As is taught in U.S. Pat. No. 2,721,249 in the name of Landis, et al. and assigned to the assignee of this application, at high current densities if the "stickout" distance is increased, the melt-off rate of the electrode in inches per minute (or pounds per minute) for a given arc current can be substantially increased and the rate of increase increases by a factor greater than one with increases in the current density.

Thus, the lineal speed of vertical-up welding is directly proportional to the melt-off rate of the electrode. By increasing the electrode melt-off rate, the lineal speed of welding is increased in a proportion greater than the amount of additional power in the arc, such that in effect, while the kilowatt input to the weld bead is greater, the rate of heat input in kilowatts per lineal inch of weld is substantially reduced.

Arc voltage is also important. Thus, at the increased lineal welding speeds, difficulty was experienced obtaining complete fusion of the corners of the edges. To obtain such fusion, the arc voltage is substantially increased over known prior practices which enables the deep penetration into the plate edges necessary to melt the corners of the edges. The additional heat contributed to the weld bead by the higher voltage is not enough to offset the reduction in heat input per lineal inch of weld due to the high speed of lineal welding permitted by the high current density in the electrode and the longer than normal stickout.

The limiting factor on voltage is the fact that the arc length increases with an increase in voltage until a point is reached where the arc length is equal to or more than the spacing between the side of the electrode and the plate edge.

At this point the arc tends to shift from: between the end of the electrode and the weld pool; to, between the side of the electrode and the plate edge. The arc then runs up the side of the electrode to the electrode energizing nozzle, destroying it. The arc voltage employed is also a function of the arc current starting at 38 volts for 400 amperes and increasing by 2 volts for each 100 amperes. Variation in voltage affects the rate of heat input much less than does variation in current, primarily because the ratio of change in electrode melt-off rate to a change of current is greater than one.

The magnetic field at the arc, while not always used, is created by providing a coil around the electrode close to the electrode nozzle tip through which the total arc current flows. This coil may consist of one or a plurality of turns. At 800 amperes one turn provides a magnetizing force of 800 ampere turns. Three turns provides 2,400 ampere turns, in either case, a substantial magnetizing force. The coil is so oriented that with the electrode positive the flux field created has a north pole on the side away from the arc. The electrode (which is a steel tube) below 700° C is magnetically permeable material and conducts the magnetic flux into the stickout portion in sufficient amounts to provide a magnetic field in the vicinity of the arc. This field causes the arc to swivel in the well as it plays on the surface of the weld pool distributing the heat toward the edges of the weld rather than just supplying it to the weld pool at the center. In this respect, it can be noted that the heat conductivity of steel decreases substantially as it is heated and is even lower when in the molten state. Thus, by causing the arc to play around, the heat is added over a large area rather than adding it at the center of the weld pool and depending on the conductivity of the molten steel to conduct the heat to the edges of the plate. With the entire surface of the weld pool at a more uniform temperature a more uniform freezing of the weld metal results and it is possible to obtain a thermal history compatible with good physical properties.

The energy input to the weld in Joules per inch of weld per inch of plate thickness is the product of arc current, arc voltage, and the time in seconds it takes to weld 1 inch of plate thickness 1 inch vertically.

The time in seconds to weld 1 inch is the weight of metal required divided by the melt-off rate of the electrode in pounds per second. The weight of metal required is the density of steel in pounds per cubic inch times the cross-sectional area of the weld gap.

Steel has a density of 0.284 pounds per cubic inch. The melt-off rate of various size electrode in pounds per second for varying lengths of stickout can be determined by experiment or extrapolated from the tables set forth hereinafter.

To use the invention, the operator decides on the gap width he will use, keeping in mind that for maximum economy in the use of welding wire and maximum speed of welding, the gap should be as narrow as possible but also realizing that it must be wide enough to accept the electrode without the electrode arcing to the plate edge. He thus knows or can readily calculate the pounds of metal required per inch of weld per inch of plate thickness.

The operator then selects an electrode size he desires to use from commercially-available electrodes. This may be anywere from approximately three thirty-second to five thirty-second inches.

The operator then selects a current he will use, preferably the maximum for the power source available to him and a voltage generally corresponding to the current as set forth hereinafter. He thus knows the watts input to the weld.

The operator divides this wattage into the minimum and maximum rates of heat input above indicated; i.e., 300,000 – 550,000 Joules per inch per inch. This gives him the range of seconds per lineal inch per inch of plate thickness, at which he must be weld.

The operator then divides both these minimum and maximum seconds by the pounds of metal required to obtain the minimum and maximum pounds of metal per second required to weld within the required range of heat input.

The operator then consults the tables showing variations in the melt-off rates for his chosen electrode diameter and chosen current vs. stickout distance and selects a stickout which will give him a melt-off rate within the required range of minimum and maximum pounds of metal per second.

It is thus possible by varying the above parameters, particularly the stickout and the current density in the stickout portion of the electrode to vary the lineal welding speed and thus the heat input per inch of weld per inch of plate thickness.

From an economic standpoint, the arc conditions should be chosen to give the highest possible lineal welding speeds while remaining within the energy input range of 300,000 – 550,000 Joules per inch of weld per inch of plate thickness. The lower heat inputs result in higher welding speeds and are thus preferred.

Normally, this lower heat input is obtained using the largest possible diameter electrode and the longest possible stickout.

The principal object of the invention is the provision of a new and improved method of vertical-up welding using molding shoes which form a well to hold the molten metal which method enables weld beads having high impact values and high yield strengths.

Another object of the invention, the provision of new and improved method for welding of the general type described wherein extremely high lineal welding speeds can be obtained.

Another object of the invention is the provision of new and improved method of vertical-up welding of the general type described wherein the heat input is so low that the deposited weld metal passes so rapidly through the critical transformation zone that high impact values and yield strengths can be obtained.

Another object of the invention is the provision of a new and improved method of vertical-up welding of the general type described wherein the stickout of the electrode beyond the energizing nozzle and the current density in the electrode stickout portion are such that the heat input to the weld per inch of weld is so low that high impact values and yield strengths are easily obtained.

Another object of the invention is the provision of a new and improved method of vertical-up welding wherein the arc is subjected to a magnetic field such that it plays around on the surface of the molten metal in the well and distributes the heat input over a wide area of the molten pool.

Another object of the invention is the provision of a new and improved arrangement for introducing a magnetic field to the arc which then causes the arc to play around on the surface of the weld pool.

The invention may take physical form in certain parts and arrangements of parts and steps, and combinations of steps, preferred embodiments of which will be described in detail in this specification, and insofar as possible, illustrated in the accompanying drawings which form a part hereof and wherein.

FIG. 3 is a cross-sectional view of FIG. 2 taken approximately of line 3—3 thereof;

FIG. 4 is a side-elevational view partly in cross section with the insulating tape of the electrode nozzle removed illustrating the preferred embodiment of the invention;

FIG. 5 is an end view of FIG. 4; and,

FIG. 6 is a cross-sectional view of FIG. 4 taken approximately in the line 6—6 thereof.

Figure 1:
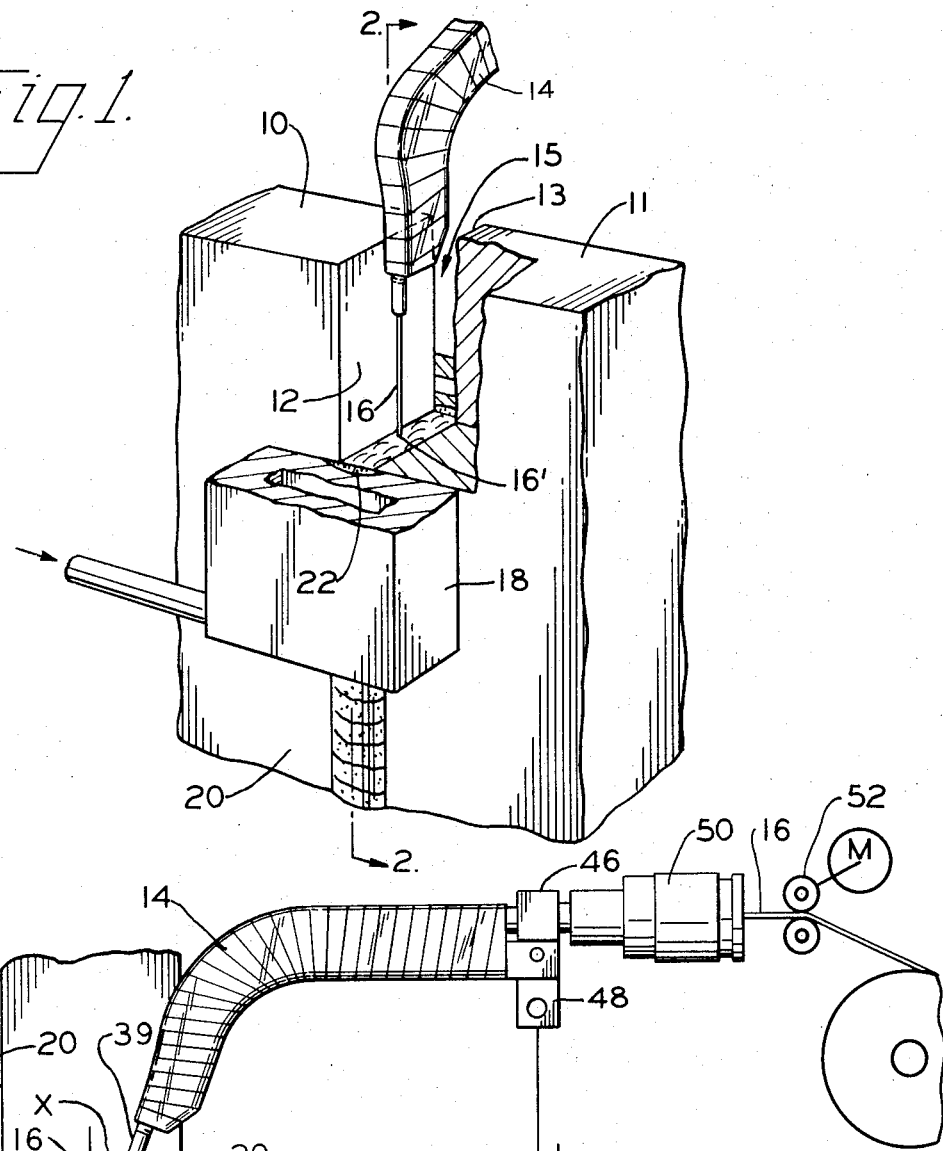
FIG. 1 is a perspective view of a pair of plates in position having their edges welded using the vertical-up process.
Figure 2:
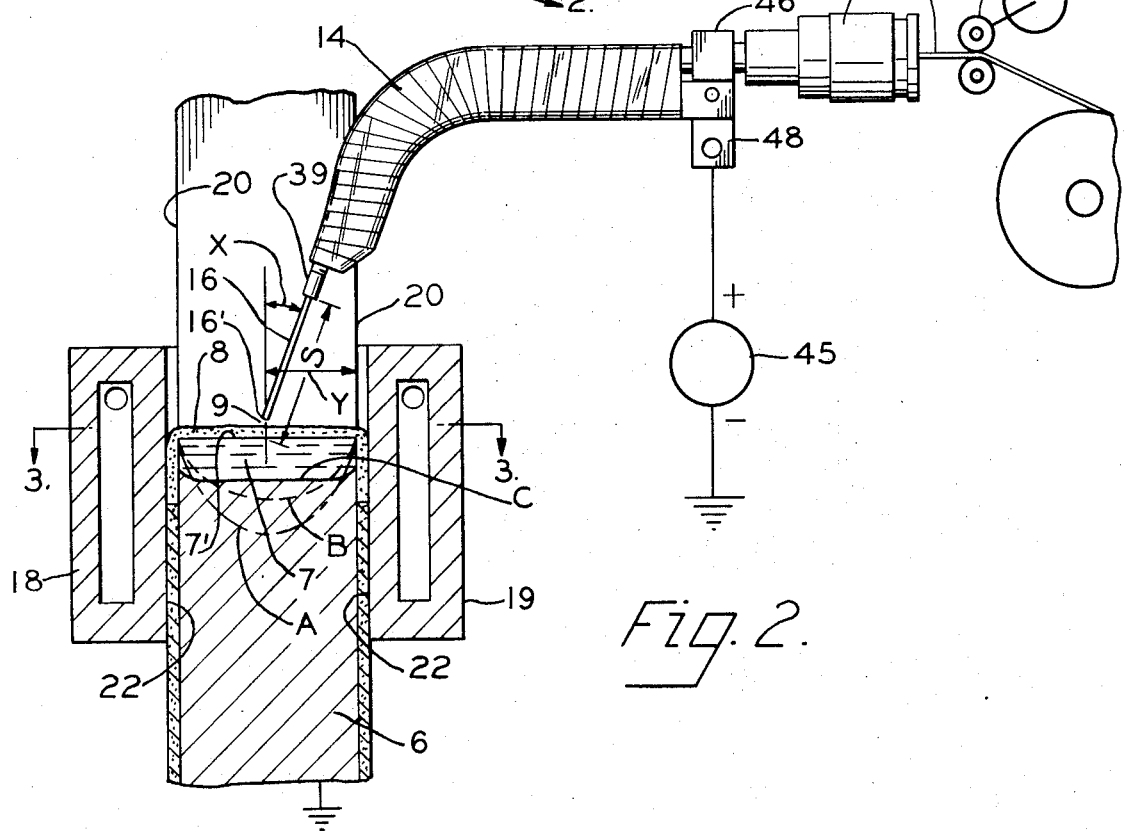
FIG. 2 is a cross-sectional view of FIG. 1 taken approximately in the line 2—2 thereof.

Referring now to the drawings wherein the showings are for the purposes of illustrating a preferred embodiment of the invention only and not for the purposes of limiting same. FIG. 1 shows a pair of metal plates 10, 11 having edges 12, 13 in spaced-parallel relationship with the long dimension extending vertically. The edges 12, 13 define a gap 15 into which weld metal is to be deposited by an electrically energized electrode 16 guided between the edges by an electrode nozzle 14. Bridging the gap 15 are a pair of water-cooled copper dams 18, 19 which are held against the sides 20 of the plates 10, 11 by any suitable pressure means not shown.

The plates 10, 11 may be of any weldable material, but preferably are steel having the usual amounts of silicon manganese, and carbon as major alloying ingredients and minor amounts of other known alloying ingredients. The plates 10, 11 may be of any thickness with the usual thickness being greater than one-half inch.

The gap width w may be as desired but is preferably between one-half and three-fourth inches. Greater widths consume too much electrode, slow down the welding and require so much heat as to make attaining the desired rate of heat input difficult.

The dams 18, 19 have surfaces 21 in sliding, sealing engagement with the sides 20 which surfaces in accordance with normal practice have a curved recess 22 of a width slightly greater than the width of the gap 15.

These dams 18, 19 are arranged to move vertically upwardly as the welding process proceeds by means not shown. The dams 18, 19 and the edges 12, 13 form a well into which molten metal from the welding electrode 16 is deposited. The dams 18, 19 are preferably made of copper and are water cooled all as is conventional.

These dams 18, 19 and the edges 12, 13 define a well 5 into which the electrode 16 extends. The bottom of this well 5 is defined by solidified weld metal 6 on top of which there is a pool of molten metal 7 with a thin layer of flux 8 thereover. The electrode 16 is so directed toward the pool at an angle X such that it's end is spaced slightly closer to the dam on the same side as the electrode nozzle 14 than to the opposite side. The distance from this side of the plate is indicated at Y. An arc 9 is maintained between the end 16' and the upper surface of the weld pool 7. The force of the arc penetrates the thin layer of flux. In this respect it is necessary in accordance with the invention that there always be an arc. Should the molten flux 8 contact the electrode tip 16', the arc will be snuffed out and erratic welding results.

While it is impossible to actually tell, it is believed that the molten pool in the well takes the shape shown by outline A when the energy input is greater than 550,000 Joules per inch of weld per inch thickness of plate.

A shallower pool as indicated by outline B is the shape assumed by the liquid metal when the energy input is within 300,000 to 550,000 Joules per inch of weld per inch of plate thickness. When the energy input is within the stipulated values and a magnetic field is added, the dispersion of the arc by the magnetic field results in a still shallower pool as shown in outline C.

In the embodiment shown the electrode 16 is fed toward the weld pool through the electrode nozzle 14, comprised of a conventional curved guide tube 35 of copper through which the electrode 16 is advanced. An energizing bar 36 extends in spaced-parallel relationship to the guide tube 35 to its lower or exit end and is brazed or welded thereto as at 37. The corresponding end of the guide tube 35 has tip 39 threaded thereinto, which has a passage therethrough of a diameter just slightly greater than the diameter of the electrode 16. The electrode 16 as it moves therepast is in electrically conducting relationship therewith and is accordingly energized.

The tube 35 is lined with a helical steel coil 40 terminating in a ceramic bushing 41 and a threaded sleeve 42 holding the parts in assembled relationship.

The opposite end of the bar 36 is arranged to be connected preferably to the positive terminal of an electric power source 45 of high current capacity through a winding of one or a plurality of turns through which the electrode 16 passes. Preferably the power source is of the constant potential type with variations in current. The right-hand end of the connecting bar 36 is brazed or soldered to a C-shaped copper member 46 having a passage through which the guide rod 35 extends and is insulated therefrom by means of an insulating sleeve 47. The end of the C opposite from where the bar 36 is attached connects to a lug 48 which is adapted to be connected to a welding power supply cable, not shown.

A bolt 49 extends in insulated relationship through the lug 48 and is threaded into the end of the energizing bar 36.

With this arrangement all the current flowing to the electrode passes from the lug 48 circumferentially around the electrode 16 to the bar 36. If desired, the member 46 can be so constructed as to have two or more turns around the electrode guide 35. Thus, in effect a coil is provided having its axis co-axial with the electrode 16. The coil is so oriented that the flow of current is counterclockwise when viewed looking away from the arc.

A nozzle mounting connector 50 is provided on the right-hand end of the guide tube 35 of conventional construction for connecting to a guide tube through which the electrode 16 is guided from remote electrode feed rolls 52 to the electrode tip 39.

Except for the construction of the electrode nozzle where the arc current flows around the electrode one or more turns, the construction of the electrode nozzle forms no part of the present invention and will not be detailed further herein.

The electrode 16 is a tubular electrode containing fluosilicate(s) on the inside which break down in the heat of the arc to form a protecting gas for the arc all as described in our copending U.S. application Ser. No. 216,233, filed Jan. 7, 1972, now abandoned is used. Such an electrode being hollow for a given diameter has a cross-sectional area for conducting current about 30 percent less than the equivalent diameter solid electrode and thus a higher current density in the stickout portion for a given current. As pointed out by increasing the current density in the stickout portion a higher melt-off rate of electrode in pounds per unit of time results.

In operation the physical setup is relatively conventional. The electrode nozzle 14 and dams 18, 19 are mounted on a single fixture (not shown) and arranged to be driven vertically up by mechanism not shown. The nozzle is spaced above the dams 18, 19 so that the lower end of the tip 39 will be substantially spaced from the surface 7' of the weld pool 7 by a distance referred to hereinafter as the stickout distance S. The passage in the electrode nozzle tip 39 is arranged at a slight angle X to the vertical to keep the tip as much as possible out of the gap. Considering the angle X and the stickout distance S, the tip 16' of the electrode 16 should be spaced from the frontside of the surface by the distance Y.

The arrangements for starting the arc and establishing the weld pool are well known and will not be described.

The motor for driving the nozzle and dams upwardly is set such that the vertical up speed is slightly in excess of the desired welding speed and operates in conjunction with weld current sensing devices such that if the weld current drops 25 amperes below the preset value, the vertical up travel drive motor is slowed down and if the current rises 25 ampers above the preset value, the motor speeds up.

In accordance with the invention current flows to the electrode from the lug 48 through the C-shaped member and thus around the electrode 16 thence downwardly through the energizing bar 36 to the tip 39, where it is conducted to the electrode 16.

The single turn of current around the electrode creates a very high intensity magnetic field coaxial with the electrode. This magnetic field is conducted through the electrode 16, (which is of magnetically permeable material) toward the arcing tip of the electrode at least until the electrode metal is heated to the Curie point. Enough magnetic flux is present at the arc to cause the arc to play around on the surface of the weld pool, that is to swivel or swirl around the tip of the electrode. The heat of the arc is thus added to the weld pool over a substantial area and in particular closer to the edges. The weld pool has a more uniform temperature and is both shallower and of more uniform depth than if no swirling existed. Cooling takes place more uniformly. The outer portions of the cooling weld bead do not have to conduct as much heat from the inner core or center of the weld bead as would be the case if the arc only existed between the center of the weld pool and the electrode. An improved grain structure results.

During welding the stickout portion of the electrode is progressively heated by the currents flowing therethrough due to $I^2R$ heating so that its temperature increases gradually toward the tip $16'$ to a temperature close to but less than the melting temperature of the metal. The arc need then only supply enough heat to raise the temperature of the electrode the rest of the way to its fusion temperature and then to melt the electrode. As less heat from the arc is required to melt the electrode, less heat from the arc is supplied to the weld pool.

To arrive at a set of welding parameters which will have a rate of heat input in accordance with the invention, the operator must first determine the pounds of electrode required per inch of weld for the particular gap to be used. A narrow gap uses less electrode which is expensive and makes achieving the low rate of heat easier to obtain. The weight of electrode in pounds per inch of weld for the various plate thicknesses and weld gaps may be tabulated as follows: (Approximately 90 percent of the tubular electrode weight is recovered as weld metal).

TABLE A

| PLATE THICKNESS INCHES | Pounds of Electrode Required GAP, INCHES | | |
|---|---|---|---|
| | ½ | ⅝ | ¾ |
| ⅝ | 0.108 | 0.135 | 0.162 |
| ¾ | 0.127 | 0.159 | 0.190 |
| ⅞ | 0.147 | 0.183 | 0.220 |
| 1 | 0.166 | 0.207 | 0.248 |
| 1¼ | 0.200 | 0.250 | 0.300 |

The excess weight over that of the density of steel is due to the curved shape of the bead surface.

Knowing the pounds of electrode required per inch, the arc current, arc voltage, electrode diameter and stickout distance must be selected to give a lineal speed of welding which will result in the desired rate of heat input. In making this selection, the operator must understand that for a given electrode diameter there is a maximum practical current and a reasonable stickout distance S. These may be tabulated as follows:

TABLE B

| ELECTRODE DIAMETER INCHES | CURRENT AMPERES | MAXIMUM REASONABLE STICKOUT, INCHES | PREFERRED STICKOUT, INCHES |
|---|---|---|---|
| .093 | 900 | 3 | 2½ |
| .120 | 1200 | 4 | 3 |
| 5/32 | 1500 | 6 | 4 |

Further in making the selection, the operator will normally select parameters that will give the maximum lineal speed of welding. Thus, he would pick the maximum current as available from his power source and then select a stickout distance S which will give a melt-off rate to result in the desired rate of heat input to the weld bead.

Within the above limitations, the melt-off rate for the various diameter electrodes for various currents in pounds per second times $10^{-4}$ may be tabulated as follows:

TABLE C

| ELECTRODE DIAMETER INCHES | CURRENT AMPERES | MELTOFF RATE POUNDS PER SECOND × $10^{-4}$ STICKOUT (INCHES) | | | |
|---|---|---|---|---|---|
| | | 2.0 | 2.50 | 3.00 | 4.0 |
| .093 | 400 | | 61 | | 835 |
| | 500 | | 80 | | 122 |
| | 600 | | 119 | | 186 |
| | 700 | | 157 | | 270 |
| | 800 | | 200 | | 390 |
| | 900 | | 325 | | — |
| .120 | 500 | | 64 | 83.5 | |
| | 600 | | 81 | 11.4 | |
| | 700 | | 111 | 153 | |
| | 800 | | 142 | 186 | |
| | 900 | | 178 | 260 | |
| | 1000 | | 222 | 320 | |
| | 1100 | | 269 | 348 | |
| | 1200 | | 323 | 390 | |
| 5/32 | | 2.0 | 2.50 | 3.00 | 4.0 |
| | 700 | 92.0 | | | 122 |
| | 800 | 114 | | | 161 |
| | 900 | 140 | | | 200 |
| | 1000 | 168 | | | 250 |
| | 1100 | 200 | | | 306 |
| | 1200 | 236 | | | 367 |
| | 1300 | 273 | | | 416 |
| | 1400 | 333 | | | 475 |

Also, the operator must know that there is a preferred arc voltage for the welding current to be used which may be tabulated as follows:

TABLE D

| WELDING CURRENT | VOLTS |
|---|---|
| 400 | 38.0 |
| 500 | 40.0 |
| 600 | 42.0 |
| 700 | 44.0 |
| 800 | 46.0 |
| 900 | 48.0 |
| 1000 | 50.0 |
| 1100 | 52.0 |
| 1200 | 54.0 |
| 1300 | 56.0 |

The voltages given are at the power source and may be slightly less at the nozzle tip due to IR drops in the welding cables. The voltage at the electrode tip 16' is not known.

The operator knowing the electrode diameter, arc current and stickout, determines the melt-off rate in pounds per second and divides this into the pounds of metal required per inch of weld. This gives the time in seconds per inch of weld.

Further, the operator can determine the watts input by multiplying the voltage times the assumed arc current. He then multiplies the watts by the time in seconds per inch of weld, and divides by the plate thickness. If the result is between 300,000 to 550,000 Joules per inch of weld per inch of plate thickness, and the weld metal chemistry is correct, the weld will meet the required physicals and particularly the minimum impact value allowed by the American Welding Society of 15 foot-lbs. at 0° F.

If the value is below 300,000, the operator must either increase the voltage or decrease the stickout distance or both and again run through the above calculations.

If the rate of heat input is too high, for a given wire size, he must increase the stickout or lower the voltage or both and again run through the above calculations.

If either of these changes requires going beyond the usable stickout for the electrode and current assumed, then a different size electrode must be selected, or the gap between plates decreased.

The operator may set up his welding operation as above described and adjust the electrode feed speed until the current is at the desired value.

A typical set of welding conditions for a 0.120 inch electrode coming within the scope of the invention are as follows:

TABLE E

| Plate thickness | 5/8 | 3/4 | 7/8 | 1 | 1 1/4 |
|---|---|---|---|---|---|
| Gap | 1/2 | 1/2 | 1/2 | 1/2 | 1/2 |
| Volts | 45–47 | 45–47 | 45–47 | 45–47 | 45–47 |
| Current, amperes | 800 | 800 | 800 | 800 | 800 |
| Stickout S, inches | 3 | 3 | 3 | 3 | 3 |
| Travel speed, inches/min | 10.5–11.5 | 8.9–9.8 | 7.6–8.4 | 6.7–7.4 | 5.5–6.1 |
| Electrode angle X | 5° | 8° | 10° | 12° | 15° |
| Spacing Y | 3/16 | 1/4 | 9/32 | 5/16 | 3/8 |
| Lbs. of electrode per inch of weld | 0.108 | 0.127 | 0.147 | 0.165 | 2.0 |
| Electrode feed speed, inches/min | 470 | 470 | 470 | 470 | 470 |
| Hours/ft. of weld | 0.0182 | 0.0214 | 0.0250 | 0.0284 | 0.0345 |
| Joules per inch of weld per inch of plate thickness, approximately | 328,000 | 321,000 | 322,000 | 320,000 | 310,000 |

Using the present invention it has been possible to obtain weld beads which clearly meet the physical requirements of the American Welding Society and other specification writers for welds consistently. On the other hand, weld beads made under heat input conditions outside the invention have failed to meet these physical requirements.

The invention has been described in connection with preferred embodiments. Obviously, modifications and variations thereof (such as larger or smaller electrodes) will occur to others upon a reading of this specification and it is intended to include all such modifications and alterations insofar as they come within the scope of the appended claims.

Having thus described our invention, we claim:

1. In a method of welding the edges of steel plates of known thickness using an electrode which produces its own shielding gas comprising:
   a. positioning the edges in vertically-extending parallel relationship with a gap therebetween of predetermined width;
   b. bridging the gap with dams to provide an upwardly opening well adapted to have molten weld metal at the bottom thereof;
   c. providing a welding electrode of known cross-sectional area;
   d. electrically energizing said electrode at a point spaced a predetermined distance from its end with a known voltage to provide an electrode stickout;
   e. feeding said electrode toward the surface of the weld pool at a feed rate to produce a predetermined current;
   f. maintaining an arc between said electrode end and said weld pool to melt said edges and melt off said electrode end as it advances to raise the surface of said weld pool, and
   g. simultaneously raising said point of electrical energization to maintain said distance generally constant;
   h. the improvement of which comprises: said electrode being hollow and containing ingredients on the inside which break down in the heat of the arc to form a protecting gas for the arc, the gap width is between one-half and three-fourth inches, and the following general conditions exist at the arc: the electrode diameter is from three thirty-seconds to five thirty-seconds inches in diameter; the stickout distance is from 2 1/2 to 3 inches for the three thirty-seconds inch electrode; from 2 1/2 to 4 inches for a one-eighth inch electrode; and from 3 1/2 to 6 inches for a five thirty-seconds inch electrode; the arc current is from 400 to 1,300 amperes and the arc voltage is from 38 volts at 400 amperes to 56 volts at 1,300 amperes increasing in approximately 2 volt steps for each 100 amperes and the heat input to the weld pool is between 300,000 and 550,000 Joules per inch of weld per inch of plate thickness.

2. The improvement of claim 1 wherein said ingredients include a fluosilicate capable of breaking down in the heat of the arc to provide a shielding gas and a slag forming ingredient.

3. The improvement of claim 1 wherein the rate of heat input is 300,000 to 450,000 Joules per inch of weld per inch of plate thickness.

* * * * *

UNITED STATES PATENT OFFICE
CERTIFICATE OF CORRECTION

Patent No. 3,806,695             Dated April 23, 1974

Inventor(s)   John E. Carroll and Carl E. Stump

It is certified that error appears in the above-identified patent and that said Letters Patent are hereby corrected as shown below:

Column 5, line 22, between "divides" and "both" insert --- the pounds of metal required by ---;

Column 5, line 23, delete "by the pounds of metal required".

Signed and sealed this 29th day of October 1974.

(SEAL)
Attest:

McCOY M. GIBSON JR.
Attesting Officer

C. MARSHALL DANN
Commissioner of Patents